US008870421B2

(12) United States Patent
Ward et al.

(10) Patent No.: US 8,870,421 B2
(45) Date of Patent: Oct. 28, 2014

(54) BICYCLE HANDLEBAR WITH INTEGRAL LIGHTING SYSTEM

(76) Inventors: Andrew Michael Ward, Cincinnati, OH (US); Adam Pennel Shaw, Proctorville, OH (US)

(*) Notice: Subject to any disclaimer, the term of this patent is extended or adjusted under 35 U.S.C. 154(b) by 109 days.

(21) Appl. No.: 13/197,860

(22) Filed: Aug. 4, 2011

(65) Prior Publication Data

US 2013/0033883 A1 Feb. 7, 2013

(51) Int. Cl.
*B62J 6/00* (2006.01)
*F21V 33/00* (2006.01)
*B62K 21/12* (2006.01)
*B62J 6/02* (2006.01)
*B62K 19/30* (2006.01)
*B62K 19/40* (2006.01)

(52) U.S. Cl.
CPC . *B62K 21/12* (2013.01); *B62J 6/02* (2013.01); *B62K 19/30* (2013.01); *B62K 19/40* (2013.01)
USPC .......... 362/474; 362/543; 362/544; 362/545; 362/473; 362/475

(58) Field of Classification Search
CPC .......... B62K 21/12; B62K 21/26; B62K 3/00; B62J 6/00; B62J 6/02; B62J 6/003; B62J 6/005; B60Q 1/32; B60Q 1/2615; B60Q 1/2696
USPC .......... 362/555, 486, 540, 543, 544, 545, 84, 362/473, 474, 475, 253, 102, 234, 464
See application file for complete search history.

(56) References Cited

U.S. PATENT DOCUMENTS

| | | |
|---|---|---|
| 2,034,934 A | 3/1936 | Anderson |
| 2,675,464 A | 4/1954 | Schwinn |
| 2,793,284 A | 5/1957 | Simoneit |
| 4,099,222 A | 7/1978 | Cornell et al. |
| 4,204,191 A | 5/1980 | Daniels |
| 4,319,307 A | 3/1982 | Turner |
| 4,337,503 A | 6/1982 | Turner |
| 4,623,954 A | 11/1986 | Schott et al. |
| 4,656,564 A | 4/1987 | Felder |
| 4,716,502 A | 12/1987 | Schott et al. |
| 4,819,135 A | 4/1989 | Padilla et al. |
| 4,875,142 A | 10/1989 | Spector |
| 4,901,209 A | 2/1990 | Nitz |

(Continued)

FOREIGN PATENT DOCUMENTS

| | | |
|---|---|---|
| CH | 120044 | 8/1947 |
| DE | 20200610 | 4/2003 |

OTHER PUBLICATIONS

Picture of seat post with rear-facing, integral light system marketed in US by Swobo more than one year prior to Applicants' filing date, labeled Photo No. 1.

*Primary Examiner* — Anh Mai
*Assistant Examiner* — Kevin Quarterman
(74) *Attorney, Agent, or Firm* — Hasse & Nesbitt LLC; Donald E. Hasse

(57) ABSTRACT

A bicycle handlebar and bicycle comprising an integral lighting system. Light emitting diodes are integrated within apertures located in the front of the handlebar to provide substantially forward illumination. A battery power supply located within the handlebar and activated by a power control supplies current to the light emitting diodes to activate them to emit light.

20 Claims, 9 Drawing Sheets

(56) References Cited

U.S. PATENT DOCUMENTS

| | | | |
|---|---|---|---|
| 5,008,782 A | 4/1991 | Murray | |
| 5,580,152 A | 12/1996 | Carter | |
| 5,795,050 A | 8/1998 | Carter | |
| 6,805,473 B2 | 10/2004 | Beard | |
| 7,377,673 B1 | 5/2008 | Hsiao | |
| 7,621,549 B2 | 11/2009 | Van Houweling | |
| 7,722,231 B2 | 5/2010 | Carillo | |
| 7,931,392 B2 | 4/2011 | Nagao et al. | |
| 2002/0163817 A1 | 11/2002 | Bukowsky | |
| 2004/0090040 A1 | 5/2004 | Pearson | |
| 2004/0095776 A1 | 5/2004 | Pisula | |
| 2006/0002119 A1 | 1/2006 | Sharp | |
| 2006/0285343 A1 | 12/2006 | Okajima et al. | |
| 2008/0002417 A1 | 1/2008 | Mohr | |
| 2009/0080207 A1* | 3/2009 | Hurwitz | 362/464 |
| 2009/0323368 A1* | 12/2009 | Campbell et al. | 362/474 |
| 2010/0053984 A1* | 3/2010 | Wang | 362/474 |
| 2010/0061112 A1* | 3/2010 | Li | 362/474 |
| 2010/0141146 A1* | 6/2010 | Lu | 315/77 |
| 2010/0182797 A1 | 7/2010 | Wells | |
| 2010/0237585 A1 | 9/2010 | Binggeli et al. | |
| 2011/0044064 A1 | 2/2011 | Hu et al. | |
| 2011/0075403 A1 | 3/2011 | Niezrecki et al. | |

* cited by examiner

BICYCLE HANDLEBAR WITH INTEGRAL LIGHTING SYSTEM

FIELD OF THE INVENTION

The present invention relates to a bicycle handlebar having an integral lighting system. More specifically, the handlebar comprises light emitting diodes integrated within apertures located in the front of handlebar to provide substantially forward illumination, and a battery power supply located within the handlebar for supplying current to the light emitting diodes. The invention also relates to a bicycle, either for an adult or child, comprising the handlebar.

BACKGROUND OF THE INVENTION

Bicycles are equipped with various lighting systems and reflectors for night use. Lights and reflectors are important safety features that make a bicycle much more visible to others and help avoid accidents.

While reflectors are useful, they are not as effective as safety lights. Bicycle operators are legally required to use safety lights while riding in the dark. Safety lights currently available include detachable battery powered lights that can be mounted on the handlebars, seatpost or other portion of the bicycle frame. After parking the bicycle and locking it, the operator normally must remove these lights to prevent theft. Because these types of lights are easily detached, operators frequently forget them or lose them.

Safety lights are powered by batteries or a generator turned by the motion of the bicycle. In either case, power is limited. If batteries are used, their size and weight may be a problem if much current is needed for long periods of time. If a generator is used, the power must be supplied by extra effort on the part of the bicyclist to overcome the increased drag of the generator.

U.S. Pat. No. 4,656,564 discloses lights inserted into the open ends of a bicycle handlebar that curve toward the rear. These lights have the disadvantage of not being visible from the front of the bicycle and also tend to be obscured by the rider's legs. U.S. Pat. No. 7,621,549 discloses a bicycle lighting system integrated into the suspension system secured to the arms of the fork crown. The lighting system preferably includes two lights configured to provide a single operating beam to illuminate the travel path. U.S. Pat. No. 5,008,782 discloses a bicycle handlebar having lights disposed along its length, such as embedded in the handlebar material. Power for the lights is supplied through jacks inserted near where the handlebar attaches to the stem of the bicycle. U.S. Patent Application Publication 2009/0080207 discloses a battery powered lighting system integrated within portions of a bicycle frame, such as a handlebar or body assembly. The light source may comprise a plurality of light emitting diodes integrated within apertures in the frame to provide omnidirectional light that is highly visible from virtually all directions.

While the above lighting systems may be useful for their intended purposes, there is a continuing need for a lightweight, cost effective, easily implemented, forward-facing safety lighting system for bicycles.

SUMMARY OF THE INVENTION

The present invention relates to a bicycle handlebar comprising an integral lighting system comprising a plurality of light emitting diodes integrated within apertures located in the front of said handlebar to provide substantially forward illumination, and a battery power supply within said handlebar activated by a power control for supplying current to said light emitting diodes to activate them to emit light.

The invention also relates to a bicycle comprising a handlebar comprising an integral lighting system comprising a plurality of light emitting diodes integrated within apertures located in the front of said handlebar to provide substantially forward illumination, and a battery power supply within said handlebar activated by a power control for supplying current to said light emitting diodes to activate them to emit light.

In one embodiment, the invention relates to a bicycle handlebar comprising an integral lighting system comprising from 2 to 6 light emitting diodes integrated within apertures located in the front of said handlebar to provide substantially forward illumination, and a battery power supply within said handlebar comprising at least 2 batteries located in the distal ends of said handlebar and activated by a power control for supplying current to said light emitting diodes to activate them to emit light, wherein the power control comprises an on-off button.

DETAILED DESCRIPTION OF THE INVENTION

The present invention provides a lighting system integrated within the handlebar of a bicycle. The lighting system comprises a plurality of light emitting diodes integrated within apertures located in the front of the handlebar to provide substantially forward illumination. A battery power supply located within the handlebar and activated by a power control supplies current to the light emitting diodes to activate them to emit light. The light provides substantially forward illumination for the bicyclist and improves visibility of the bicycle to others, including approaching traffic. By placing the light emitting diodes, battery power and connecting circuitry all inside the handlebar, the invention provides a lightweight, durable, reliable and cost effective lighting system that can be easily implemented, including by a consumer replacing an original handlebar. There are no separate wires, switches or attachable lights that need to be installed. The safety lighting system herein is always readily available for the bicycle operator when needed. The lights cannot be removed and stolen while the bicycle is parked. The forward-facing lights illuminate the pathway of travel without interfering with the vision of the operator as in the case with omnidirectional lighting systems. Finally, the invention provides a sleek and more attractive alternative to the detachable lights currently available in the market.

Figure 1:
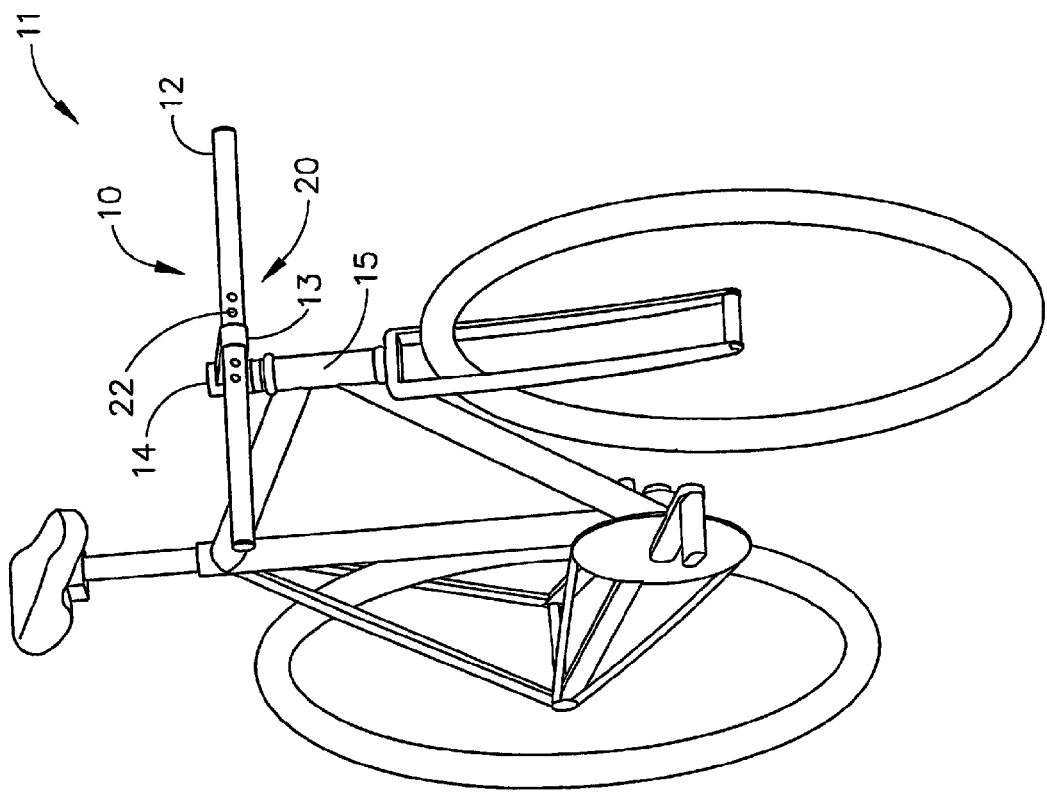
FIG. 1 is a perspective view of a bicycle and handlebar of the invention.
Figure 2:
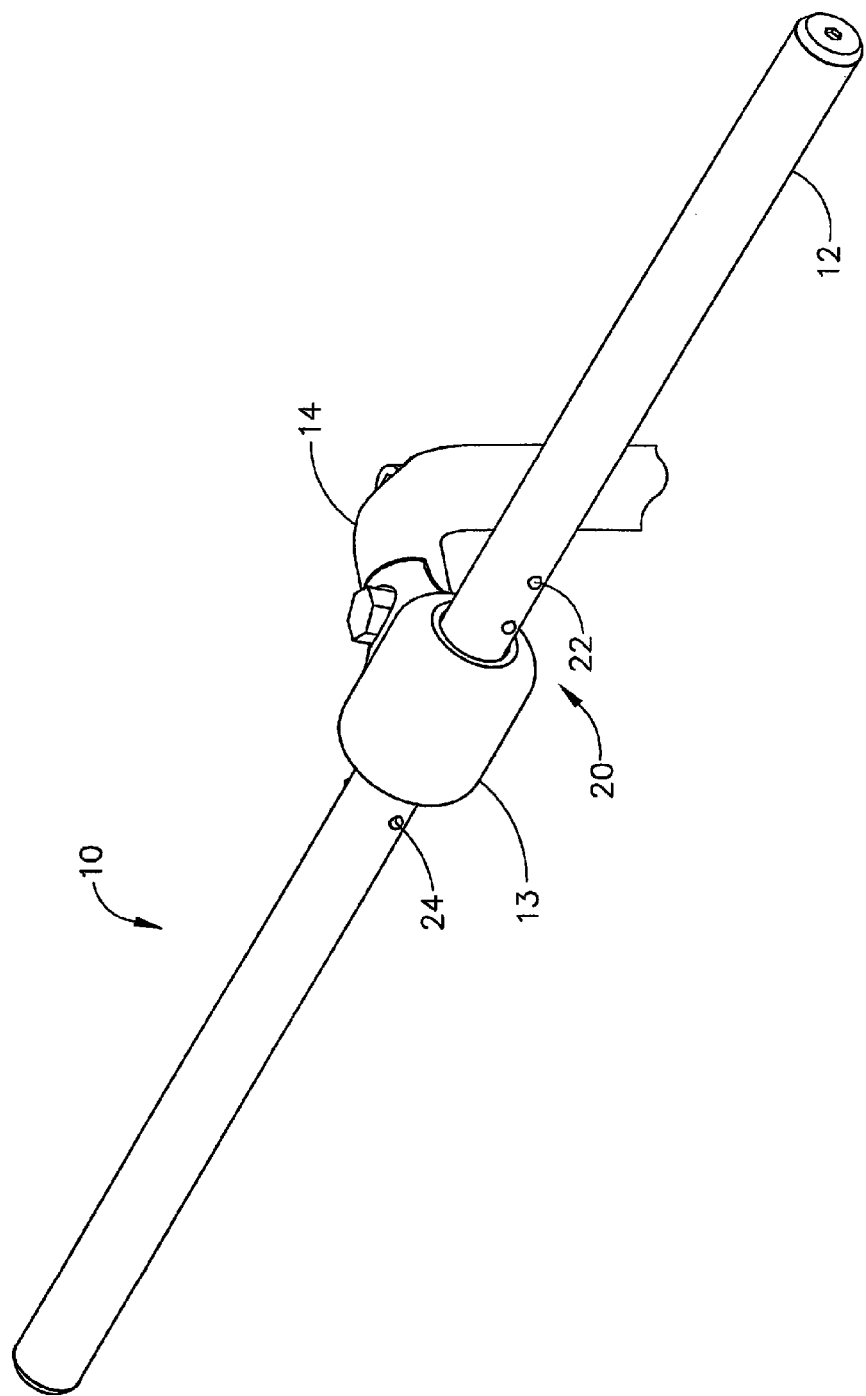
FIG. 2 is an enlarged perspective view of the handlebar of FIG. 1.
Figure 3:
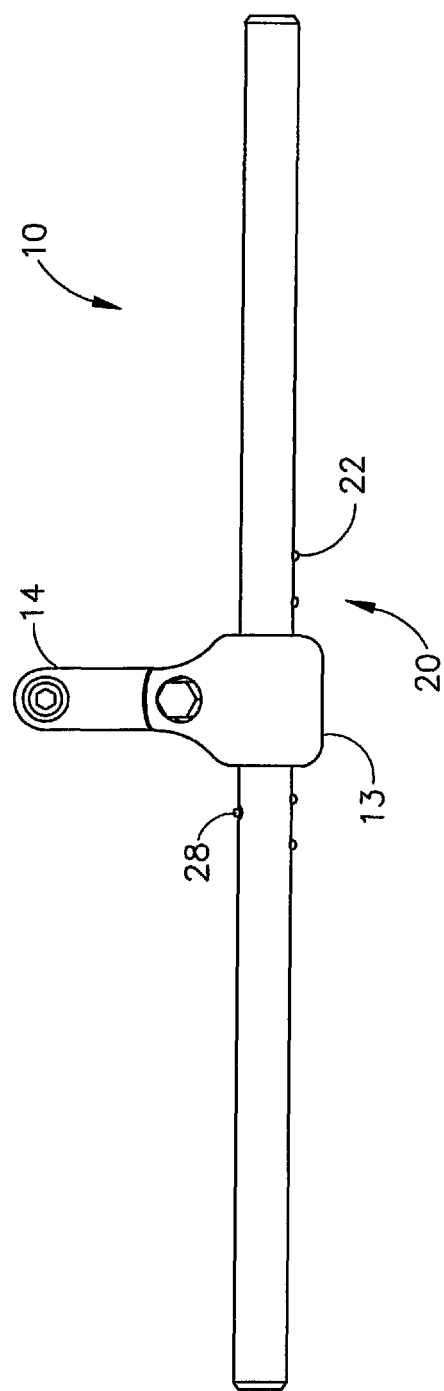
FIG. 3 is a top view of the handlebar of FIG. 1.
Figure 4:
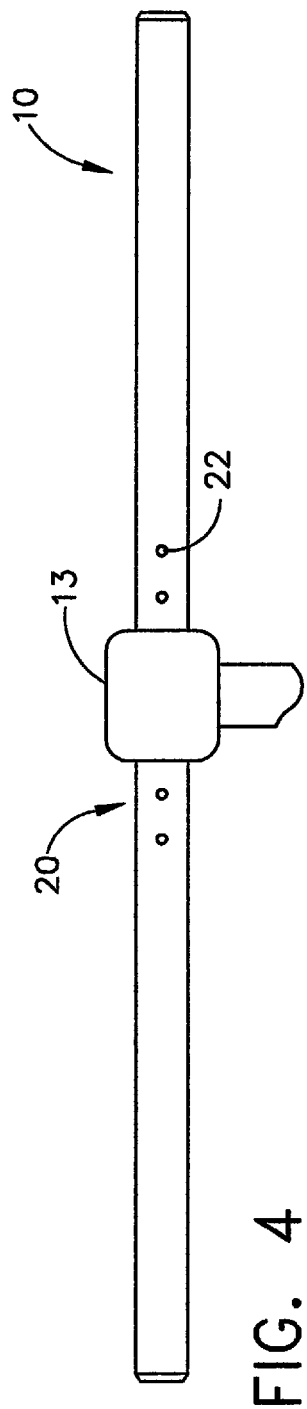
FIG. 4 is a front view of the handlebar of FIG. 1.

FIG. 1 illustrates one embodiment of the invention, wherein handlebar 10 of bicycle 11 contains integral lighting system 20. Handlebar 10 is a hollow cylindrical bar that can be made of any strong, rigid material, for example, steel, aluminum, hard plastic or carbon fiber material. Handlebar 10 has distal ends 12, which may be covered by plastic or rubber hand grips. As shown in FIGS. 1-3, handlebar 10 is attached to the stem 15 of the bicycle through attachment 13 and stem attachment 14. Threaded bolts and nuts, such as shown in FIGS. 2-3, may be used to secure attachment 13 to the handlebar and to stem attachment 14, and the stem attachment to the stem of the bicycle, as known in the art. The shape, size and design of the handlebar may be varied as known in the art, for example, as in handlebars 50 and 60 in FIGS. 5-7.

Lighting system 20 of handlebar 10 comprises four light emitting diodes 22 integrated within apertures 24 (shown in FIGS. 2 and 9) located in the front of the handlebar to provide substantially forward illumination. The number, size, output and type of the light emitting diodes can be varied to meet particular design criteria. The lighting system typically comprises from two to six light emitting diodes in the front of the handlebar, but may comprise eight or more light emitting diodes. However, the number of light emitting diodes, and accompanying batteries and electrical connectors, should be limited to minimize the cost and complexity of the handlebar, while providing the desired level of forward illumination. Also, the number of apertures in the handlebar should be limited to avoid reducing its strength, without otherwise making the handlebar too thick and heavy. Thus, the number of apertures, and the number of light emitting diodes, in the handlebar is typically less than ten, more typically less than eight.

Figure 5:
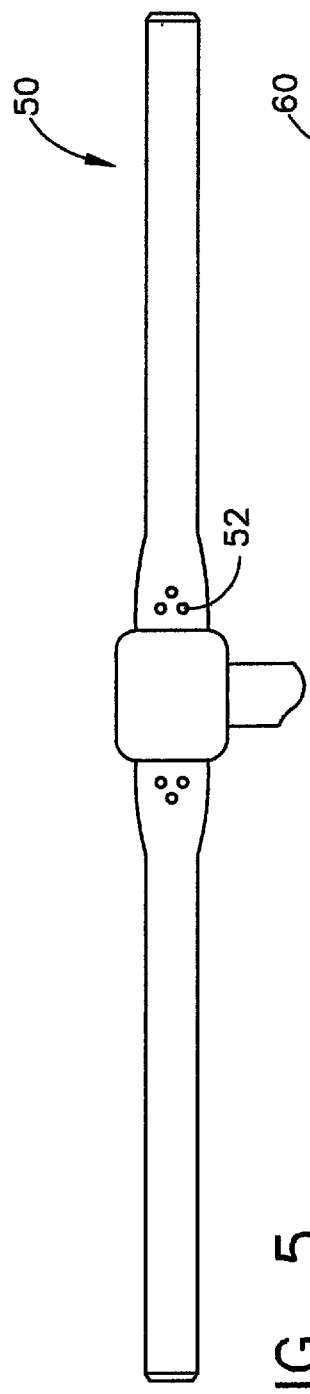
FIGS. 5 and 6 are front views of other handlebars of the invention.
Figure 6:
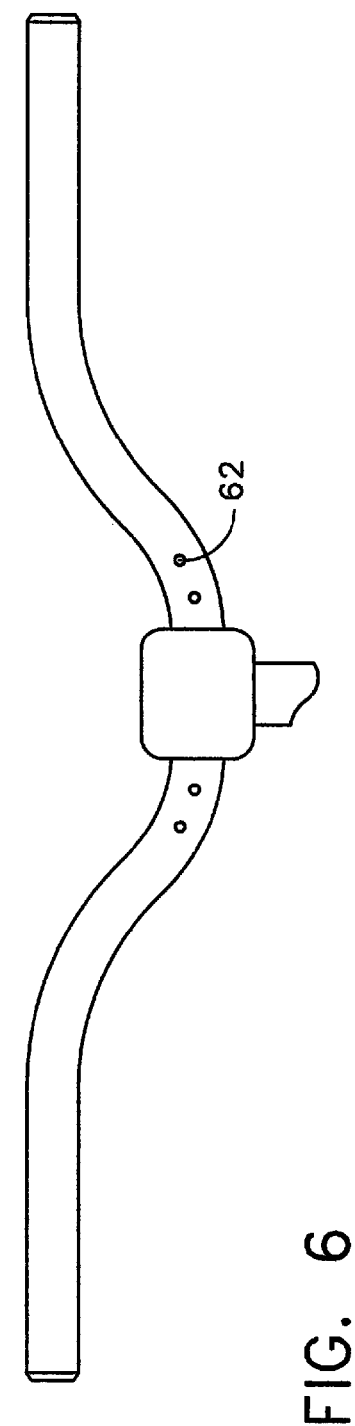
Figure 7:
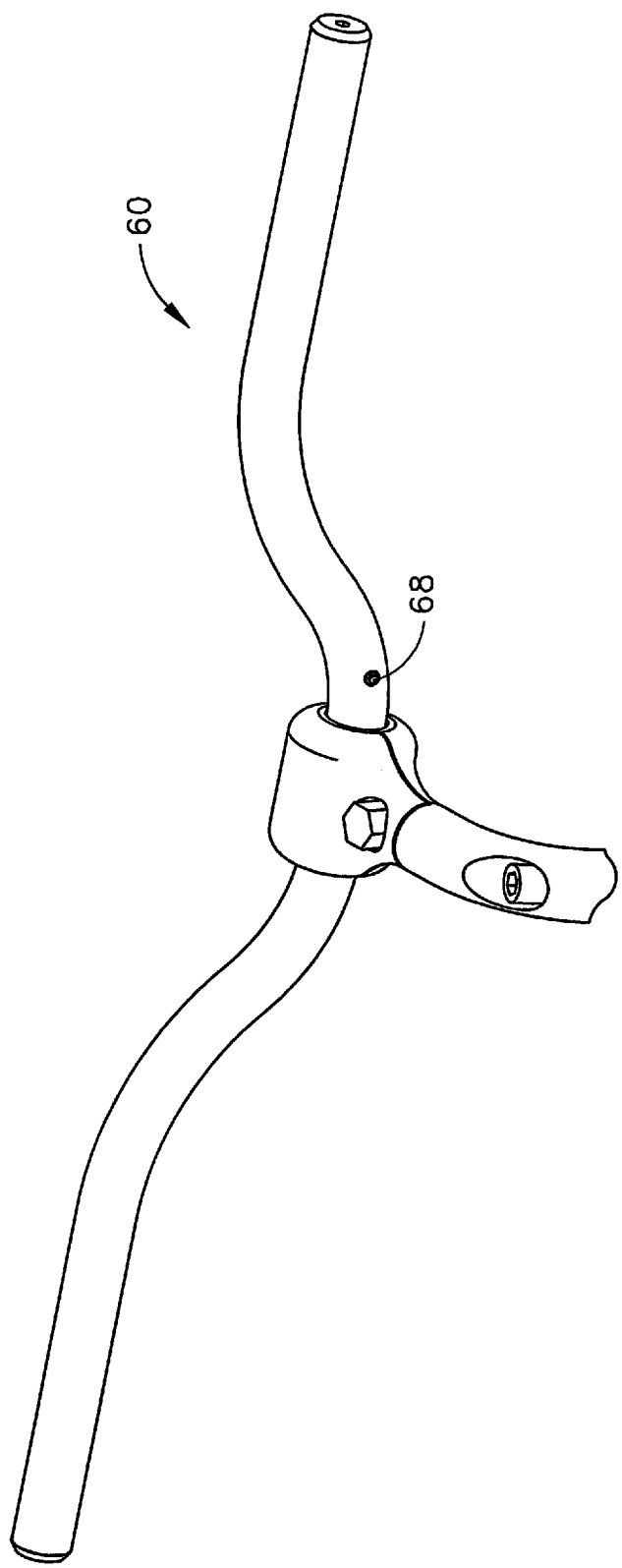
FIG. 7 is a rear perspective view of the handlebar of FIG. 6.

The light emitting diodes typically are centrally located in the front of the handlebar, but can be spaced and distributed as desired to provide substantially forward illumination. The light emitting diodes should illuminate the pathway in front of the bicycle and not direct light toward the eyes of the operator or otherwise interfere with the vision of the operator. FIGS. 5 and 6 illustrate lighting systems comprising six and four light emitting diodes 52 and 62, respectively, in different configurations. The light emitting diodes may be sequenced intermittently to generate moving, blinking, flashing or cascading light, if desired. The light emitting diodes typically are white lights, but may emit colored light, or various different colors of light.

The light emitting diodes are powered by a battery power supply located within the handlebar. The battery power supply is controlled by a power control for supplying current to the light emitting diodes to activate them to emit light. The battery power supply includes one or more batteries, typically located within at least one distal end of the handlebar for easy accessibility. The handlebar typically comprises at least two batteries located within the distal ends of the handlebar. For example, two or three batteries are typically located in each distal end of the handlebar. The batteries may be secured within the handlebar with caps attached to the distal ends thereof.

The power control connected to the battery power supply may be activated in a number of different ways, including: (i) an on/off button or power switch; (ii) a light sensor engaged with the power control and attached to the battery power supply for automatically activating/deactivating the current supply to the light emitting diodes; (iii) a card reader and a key that activates the card reader; or (iv) one or more acceleration detecting means, a delay generating circuit means, and a microprocessor, such as disclosed in U.S. Patent Application Publication 2009/0080207, incorporated herein by reference.

Figure 8:
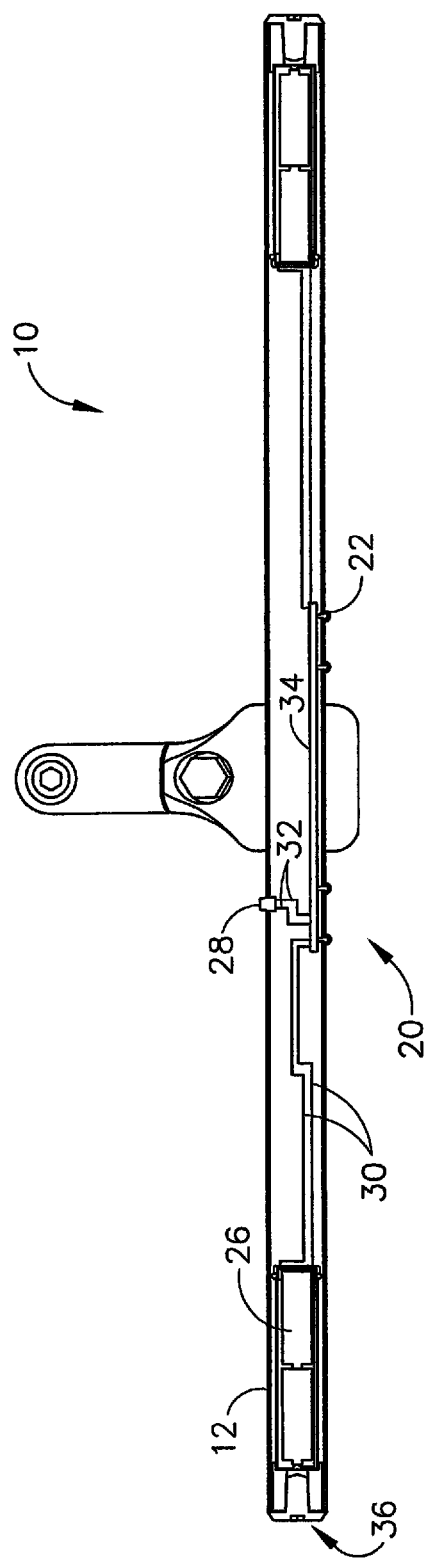
FIG. 8 is a top sectional view of the handlebar of FIG. 1 showing the integral lighting system within the handlebar.

FIG. 8 is a sectional view of the handlebar 10 of FIG. 1, showing a section of the integral lighting system 20. Four apertures 24 (shown in FIGS. 2 and 9) located in the front of the handlebar house light emitting diodes 22 (for example, 5 mm or 10 mm LEDs). Each distal end 12 of the handlebar contains two batteries 26 (for example, AA or AAA batteries), which may be rechargeable, to power the light emitting diodes when the on/off button 28 (for example, an on/flash sequence/off button) is turned on. An electric current is supplied to the light emitting diodes through circuit board 34 by internal wires 30. The lights are wired in parallel so that the failure of one does not extinguish the others. One of the wires 30 is negative and the other is positive. The on/off button 28 is electrically connected to the light emitting diodes 22 through circuit board 34 by internal wires 32. In other embodiments, an on/off button or other power control unit may be located on other portions of the handlebar, such as on/off button 68 in FIG. 7, or in a cap attached to the distal end of the handlebar.

Figure 9:
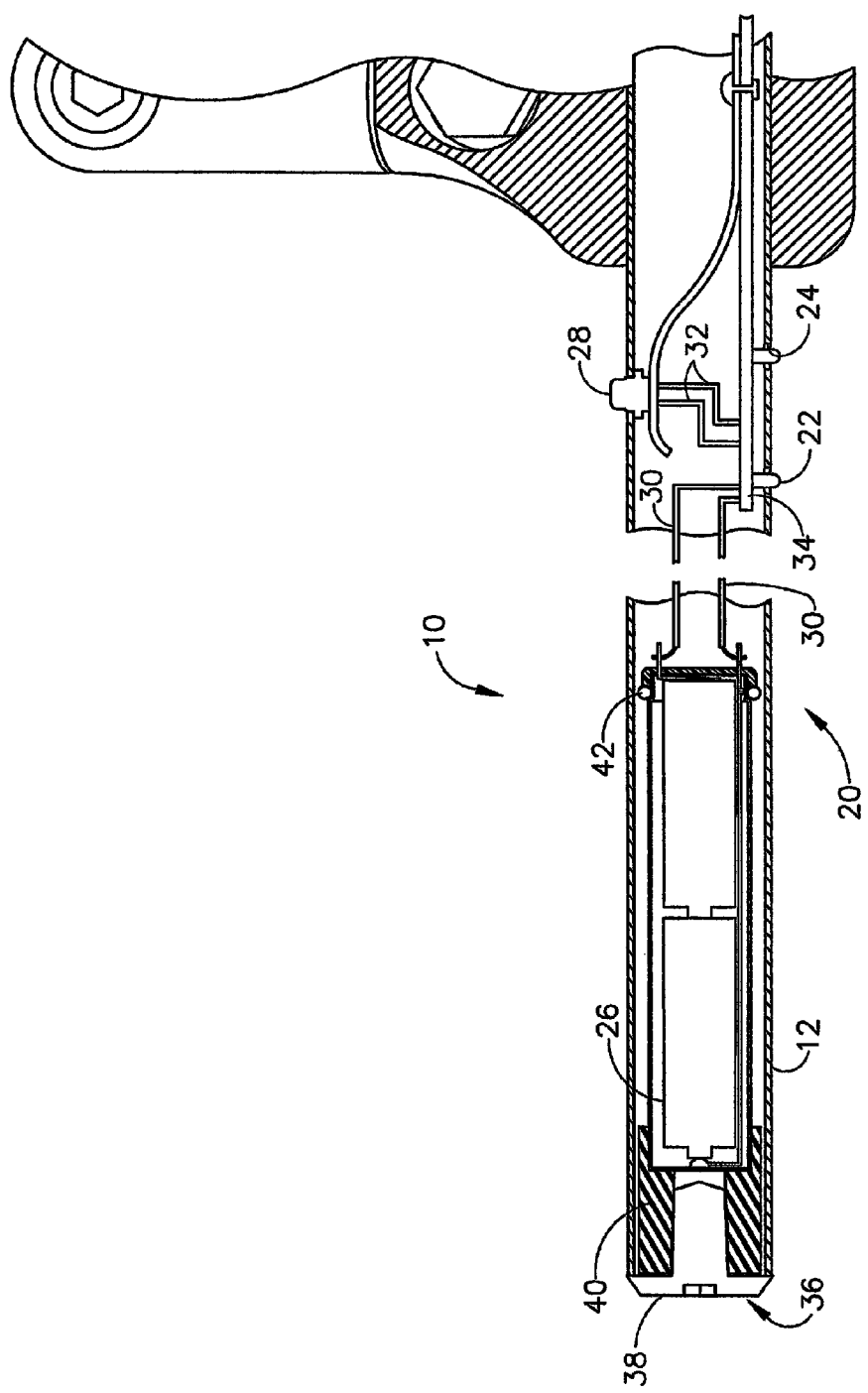
FIG. 9 is an enlarged sectional view of a portion of the handlebar of FIG. 8.

As shown in FIG. 9, two batteries 26 are located within each distal end 12 of handlebar 10. The batteries are secured within the handlebar by cap 36 attached to the distal end thereof. The cap can be easily removed to remove or replace the batteries. In the embodiment shown in FIG. 9, the batteries are further secured within the handlebar by rubber expansion piece 40 and screw 38. Alternatively, a threaded cap can be screwed into matching threads on the interior or exterior of the distal end of the handlebar. The batteries 26 are held firmly in place by rubber expansion piece 40 and o-ring 42.

Figure 10:
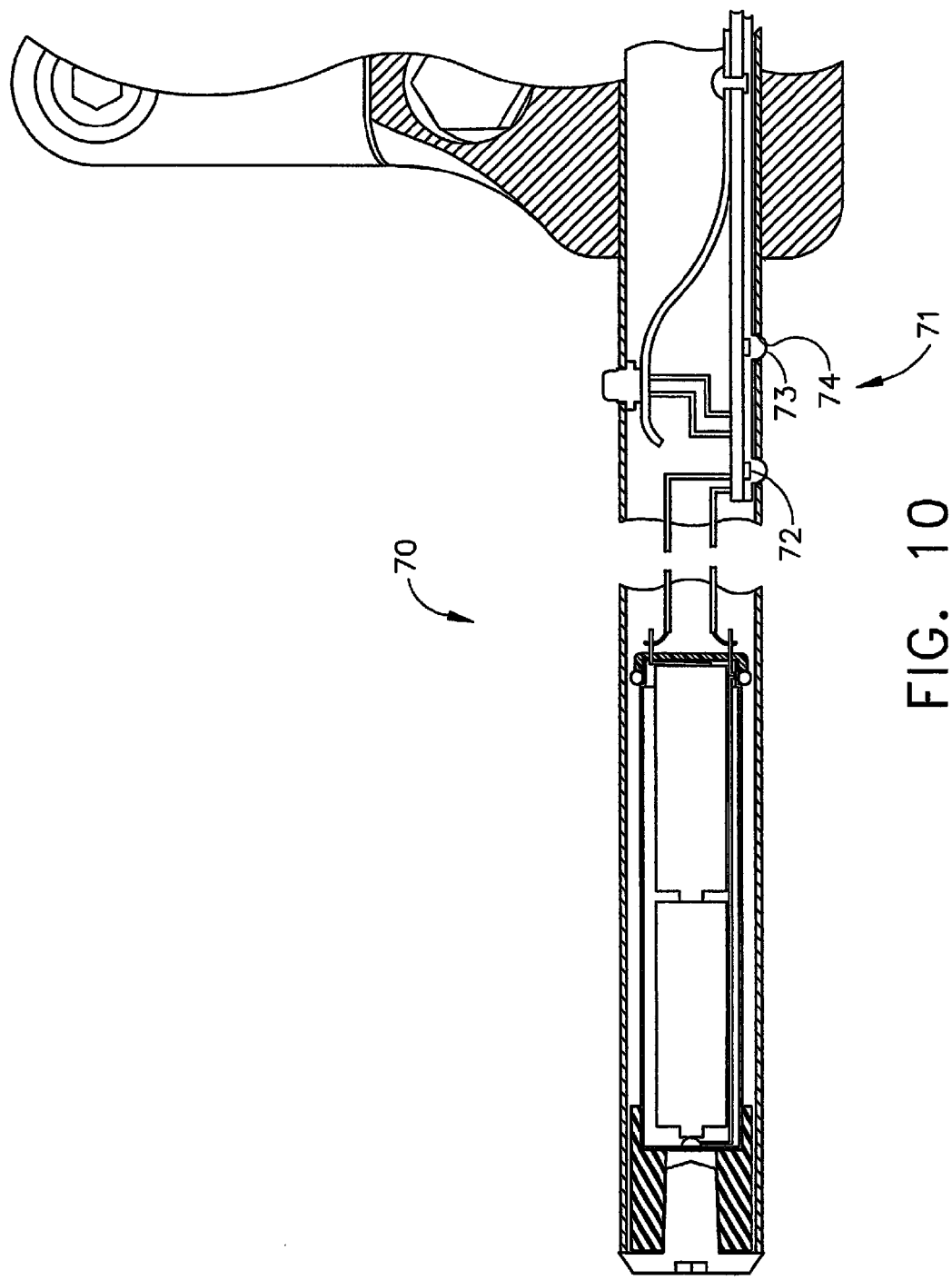
FIG. 10 is an enlarged sectional view of a portion of another handlebar of the invention.
Figure 11:
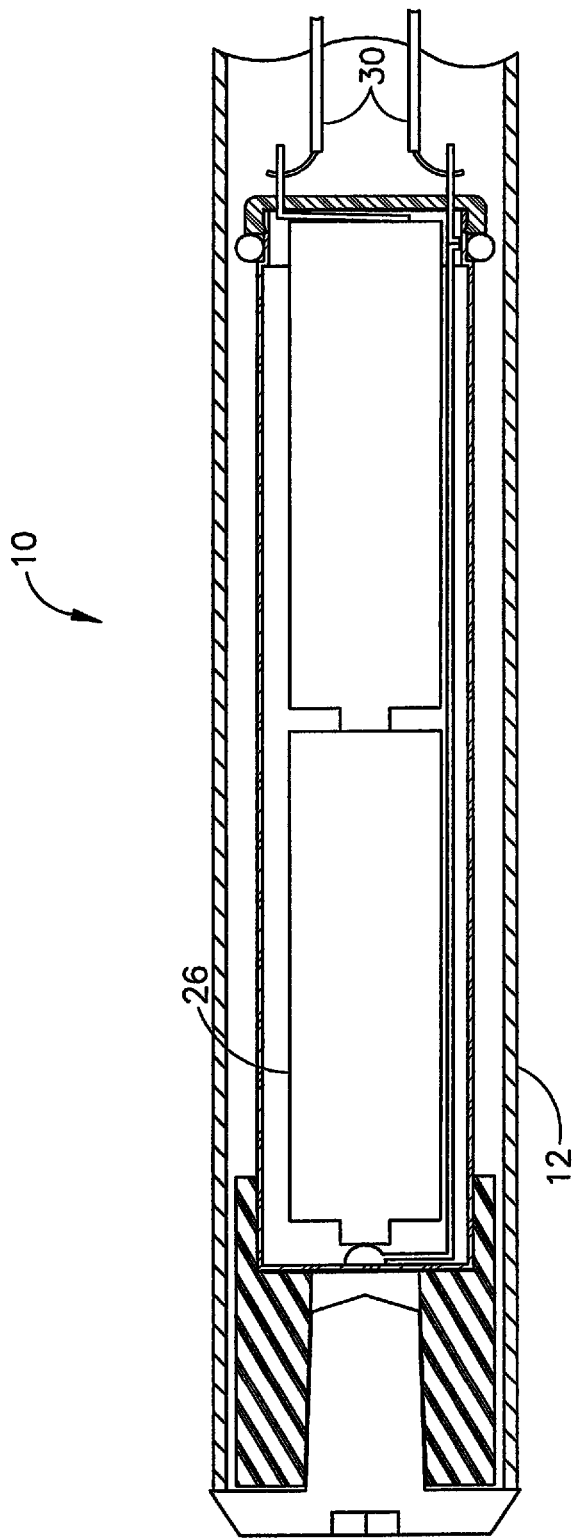
FIG. 11 is an enlarged sectional view of a distal end portion of the handlebar of FIG. 9.

FIG. 10 illustrates another handlebar 70 of the invention. Handlebar 70 is similar to handlebar 10 except it comprises flat light emitting diodes 72 integrated within apertures 74 and covered by plastic focusing lens 73. The other elements and variations discussed above can be applied to handlebar 70.

While particular embodiments of the invention have been described, the invention can be further modified within the spirit and scope of this disclosure. For example, other portions of the frame of a bicycle may contain an integral lighting system, which may or may not be connected to the integral lighting system herein. This application is therefore intended to cover any variations, uses or adaptations of the invention using its general principles. Further, the application is intended to cover such departures from the present disclosure as come within known or customary practice in the art to which this invention pertains and which fall within the appended claims.

We claim:

1. A bicycle handlebar comprising an integral lighting system comprising:
   a) a plurality of light emitting diodes integrated within apertures located in the front of said handlebar that provide illumination consisting of substantially forward illumination, and b) a battery power supply within said handlebar activated by a power control for supplying current to said the plurality light emitting diodes to activate them to emit light, wherein the plurality light emitting diodes are located only in the front of said handlebar so that said integral lighting system provides illumination consisting of substantially forward illumination.

2. The handlebar of claim 1 comprising from 2 to 6 light emitting diodes located in the front of said handlebar.

3. The handlebar of claim 2 comprising 4 light emitting diodes located in the front of said handlebar.

4. The handlebar of claim 3 comprising 2 batteries located within each distal end of said handlebar.

5. The handlebar of claim 1 comprising at least 2 batteries located within the distal ends of said handlebar.

6. The handlebar of claim 5 wherein the batteries are rechargeable.

7. The handlebar of claim 5 wherein the batteries are secured within said handlebar with caps attached to the distal ends thereof.

8. The handlebar of claim 7 comprising 2 batteries located within each distal end of said handlebar.

9. The handlebar of claim 8 comprising 4 light emitting diodes located in the front of said handlebar.

10. The handlebar of claim 1 wherein the power control comprises an on-off button.

11. A bicycle comprising a handlebar comprising an integral lighting system comprising: a plurality of light emitting diodes integrated within apertures located in the front of said handlebar that provide illumination consisting of substantially forward illumination, and b) a battery power supply within said handlebar activated by a power control for supplying current to said light emitting diodes to activate them to emit light, wherein the plurality light emitting diodes are located only in the front of said handlebar so that said integral lighting system provides illumination consisting of substantially forward illumination.

12. The bicycle of claim 11 wherein the handlebar comprises from 2 to 6 light emitting diodes located in the front of said handlebar.

13. The bicycle of claim 12 wherein the handlebar comprises 4 light emitting diodes located in the front of said handlebar.

14. The bicycle of claim 11 wherein the handlebar comprises at least 2 batteries located within the distal ends of said handlebar.

15. The bicycle of claim 14 wherein the batteries are secured within said handlebar with caps attached to the distal ends thereof.

16. The bicycle of claim 15 wherein the handlebar comprises 2 batteries located within each distal end of said handlebar.

17. The bicycle of claim 16 wherein the handlebar comprises 4 light emitting diodes located in the front of said handlebar.

18. The bicycle of claim 17 wherein the power control comprises an on-off button.

19. A bicycle handlebar comprising an integral lighting system comprising: a) from 2 to 6 light emitting diodes integrated within apertures located in the front of said handlebar to provide substantially forward illumination, and b) a battery power supply within said handlebar comprising at least 2 batteries located in the distal ends of said handlebar and activated by a power control for supplying current to said light emitting diodes to activate them to emit light, wherein the power control comprises an on-off button, wherein the light emitting diodes are located only in the front of said handlebar so that said integral lighting system provides illumination consisting of substantially forward illumination.

20. The handlebar of claim 19 comprising 4 light emitting diodes located in the front of said handlebar and 2 batteries located within each distal end of said handlebar.

\* \* \* \* \*